Patented Aug. 25, 1953

2,650,226

UNITED STATES PATENT OFFICE 2,650,226

FURO AND THIENO QUINALDINES AND PROCESS FOR MAKING SAME

Hans Andersag and Helmut Timmler, Wuppertal-Elberfeld, Germany, assignors to Schenley Industries, Inc., New York, N. Y., a corporation of Delaware No Drawing. Application May 22, 1951, Serial No. 227,741. In Germany May 24, 1950

11 Claims. (Cl. 260—288)

This invention relates generally to synthetic organic chemical compounds of the aromatic series having two fused heterocyclic nuclei fused to a homocyclic nucleus and, in a more particular sense, it relates to certain novel quinaldine derivatives wherein an aliphatic chain comprising a heteroatom bridges the third and fourth positions of the quinaldine molecule. The invention also relates to processes for making said compounds. These compounds are useful per se as chemotherapeutic agents and also are useful as intermediates in the synthesis of other valuable chemical compounds.

This application is related to our copending applications Serial Nos. 227,742 and 227,743 filed concurrently herewith on May 22, 1951 as parent and continuation-in-part applications respectively disclosing members of the same generic class of compounds.

The novel chemical compounds of this invention may be represented by the following basic structural formula:

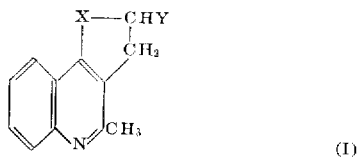

(I)

wherein the heteroatom, X, is either oxygen or sulfur and Y is hydrogen or methyl. The compounds of this invention may be substituted or may bear one or at most two substituents in the 6, 7, 8 and 9 positions chosen from the group consisting of lower alkyl, lower alkoxy, lower carboalkoxy, lower alkanoylamino, halo and cyano groups. These compounds are useful in chemotherapy because of their analgesic and analeptic properties, and also may be used as intermediates in the production of compounds having amoebicidal activity.

These novel compounds of this invention can be synthesized readily by reacting aniline or a suitably substituted aniline with α-acetyl-butyrolactone to form a Schiff's base type compound, then abstracting water from this compound with phosphorus pentoxide, sulfuric acid, zinc chloride or similar strongly reactive reagents, to obtain the desired product, according to reactions that may be represented as follows:

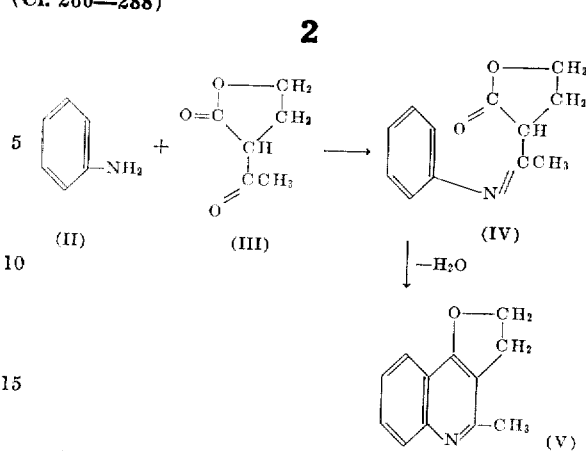

The compounds of this invention also can be synthesized readily from unsubstituted or suitably substituted 4-hydroxy-quinaldines by reaction with a 2:3Δ-alkylene halide to produce the corresponding 4-alkenyloxy compound which, when heated at high temperatures, intramolecularly rearranges in an unexpected, unpredictable manner to the corresponding 3-(2':3'Δ-alkenyl)-4-hydroxy-quinaldine. When treated with a mineral acid, these last-mentioned compounds cyclize to yield triple fused ring compounds comprised of a furano ring fused at the c position to the quinaldine molecule. These reactions may be represented as follows:

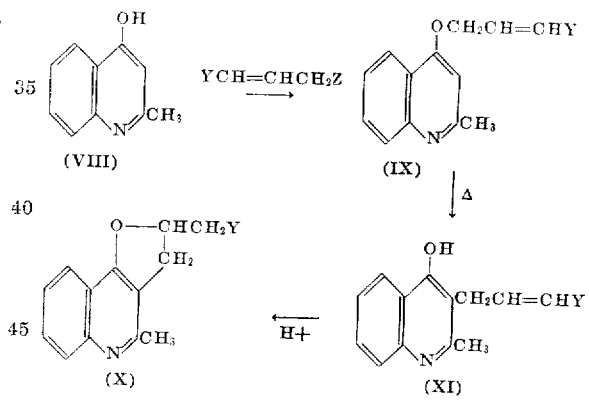

In these formulae Y represents hydrogen or lower alkyl and Z represents a halogen atom. The 4-hydroxy-quinaldine compounds used as starting materials may be synthesized readily by known methods or they may be prepared by reacting aniline or a suitably substituted aniline with an acetoacetic acid ester, such as ethyl acetoacetate, to form a Schiff's base type compound, then cyclizing this compound by heating at an elevated temperature to form the desired 4-hydroxy-quinaldine product.

These reactions for preparing the starting materials may be represented, in general terms without regard for nuclear substituents that may be present on the aniline molecule, as follows:

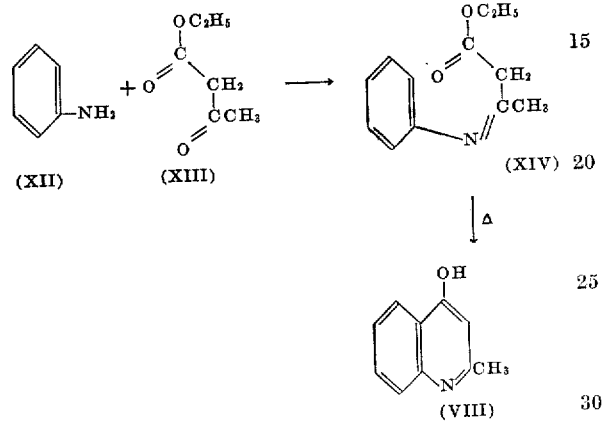

The compounds comprising a fused dihydrothiophene nucleus can be prepared easily from the Schiff's base (IV) by reacting it with phosphorus pentasulfide at a high temperature, which yields the desired compound directly. These reactions may be represented as follows:

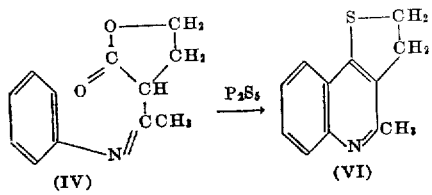

These latter thieno-quinaldines also can be prepared by reacting compound IV with a phosphorus oxyhalide and reacting the product of that reaction with thiourea. The reactions may be represented as follows:

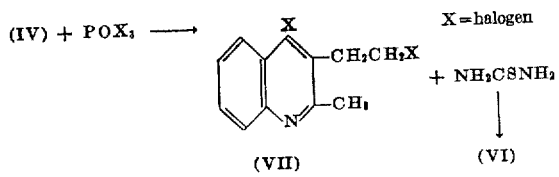

The new compounds of this invention are obtained as solid, crystalline, stable products, yielding more or less easily water-soluble salts with the common mineral acids, such as the hydrohalogen acids, sulfuric acid, phosphoric acid, nitric acid and the like.

To facilitate a better understanding of the subject matter of this invention, particularly the details of the process steps whereby novel compounds of the invention may be synthesized, certain specific examples herewith follow, but it is to be understood clearly that these examples are provided for purposes of illustration merely and are not to be construed, in any way, as limitations upon the scope of the invention.

Example 1

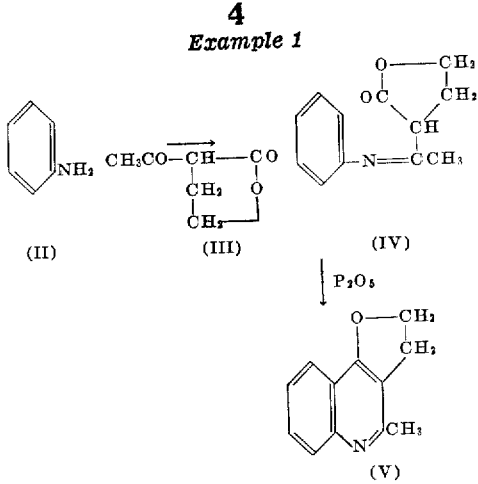

20 parts of the Schiff's base (M. P. 89° C.) prepared by condensing aniline and α-acetyl-butyrolactone, are boiled with stirring, in 100 parts of tetraline with 20 parts of phosphorus pentoxide for one to two hours, then the tetraline is decanted and the residue is mixed with ice water and ammonia. The reaction product is taken up with ether, the ether dried over calcium chloride and the ethereal residue is distilled. The product, 2:3-dihydro-4-methyl-furo (3:2-c) quinoline, boils at 169–170° C. under 4–5 mm. pressure. After recrystallization from ligroin, colorless prismatic needles, melting at 140° C., are obtained; the perchlorate melts at 245° C., the hydrochloride at 268° C. The same product is obtained when anhydrous zinc chloride is substituted for the phosphorus pentoxide, or when the Schiff's base is heated with 10 times its weight of concentrated sulfuric acid at 50° C.

By processing suitably selected starting materials in an analogous manner, the following compounds can be obtained:

(XV)

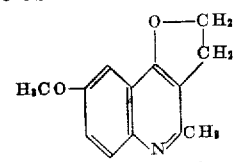

2:3 - dihydro - 4 - methyl-8-methoxy-furo(3:2-c)quinoline, melting point 126° C.; its hydrochloride, melting point 263° C.

(XVI)

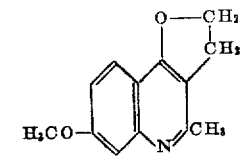

2:3 - dihydro - 4 - methyl-7-methoxy-furo(3:2-c)quinoline, melting point 163° C.

(XVII)

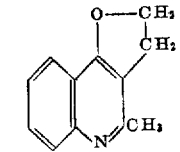

2:3 - dihydro - 4 - methyl-6-methoxy-furo(3:2-c)quinoline, melting point 190° C.

(XVIII)

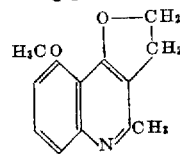

2:3-dihydro-4-methyl-6;9 dimethoxy-furo(3:2-c)-quinoline, melting point 193° C.

(XIX) 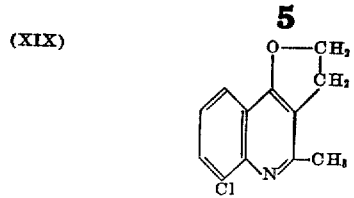
2 : 3-dihydro-4-methyl-6-chloro-furo(3 :2-c)quinoline, melting point 130° C.

(XX) 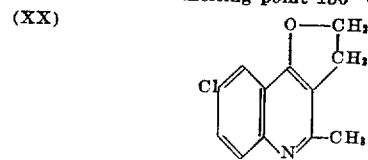
2 : 3-dihydro-4-methyl-8-chloro-furo(3 : 2-c)quinoline, melting point 169° C.

(XXI) 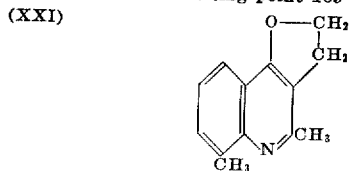
2 : 3-dihydro-4 : 6-dimethyl-furo(3 : 2-c)quinoline, melting point 117° C.

Example 2

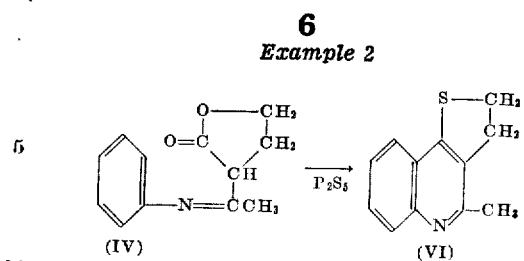

About 50 parts of the Schiff's base (IV) are heated in 400 parts of diphenyl ether at 220° C. and 100 parts of phosphorus pentasulfide are slowly added thereto. After the addition of phosphorus pentasulfide is completed, the mixture is heated at 220° C. for a further half hour, then cooled, decanted, and the tarry residue is mixed with dilute ammonia. The free base formed is taken up with ether, shaken out by means of dilute hydrochloric acid, and after clarifying with animal charcoal, the hydrochloric solution is mixed with ammonia. The precipitated free base is recrystallized twice from ligroin, yielding a product which is obtained as colorless needles, melting at 109° C.

Example 3

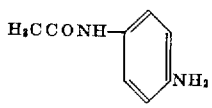   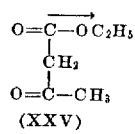   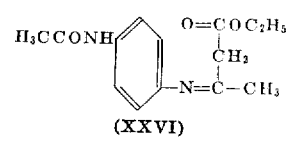

(XXIV)   (XXV)   (XXVI)

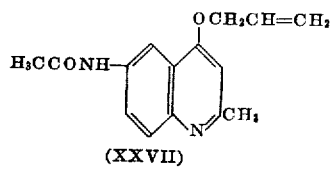   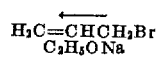   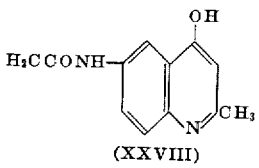

(XXVII)   (XXVIII)

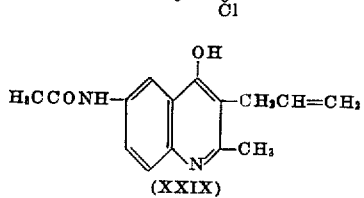   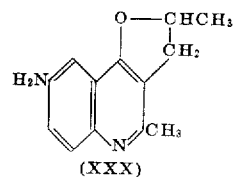

(XXIX)   (XXX)

Cyclization by heating with HBr followed by hydrolysis with alkali (XXII) 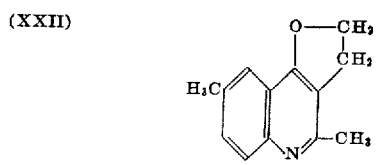
2 : 3-dihydro-4 : 8-dimethyl-furo(3 : 2-c)quinoline, melting point 141° C.

(XXIII) 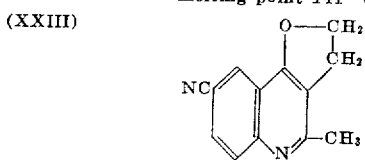
2 : 3-dihydro-4-methyl-8-cyano-furo(3 : 2-c)quinoline, melting point 230° C.

Approximately 150 grams of 4-amino-acetanilide are boiled under reflux for 4 hours with about 130 grams of ethyl acetoacetate in half a liter of methyl alcohol, then the mixture is cooled and the crystal paste is removed and washed with methyl alcohol. The Schiff's base product so obtained melts at 182° C.

About 200 grams of this product are stirred, in portions, into one liter of 1-chloronaphthalene at 250° C. After completion of the reaction, the mixture is cooled and the crystallized 4-hydroxy-6-acetamino quinaldine is removed and washed with benzene. This compound does not melt at temperatures up to 300° C.

About 216 grams of 4-hydroxy-6-acetylamino-quinaldine are introduced into a boiling sodium ethylate solution, prepared by adding 32 grams of sodium to 1 liter of alcohol, and then approximately 120 grams of allyl bromide is added, portionwise, with further boiling. After boiling for 3 hours, most of the alcohol is distilled off and the allyl ether of 4-hydroxy-6-acetylamino-quinaldine is precipitated with ether. The product is washed with caustic soda solution and water, then recrystallized from a solution of alcohol and ether, and it melts at 176° C.

Approximately 150 grams of this allyl ether are stirred into half a liter of 1-chloronaphthalene at 220–230° C. After 10 minutes, the solution is allowed to cool while stirring, then it is filtered and the residue is washed with benzene. The 3-allyl-4-hydroxy-6-acetamino-quinaldine thus obtained does not melt at temperatures up to 300° C.

About 125 grams of 3-allyl-4-hydroxy-6-acetamino-quinaldine are stirred at room temperature into 500 cc. of hydrobromic acid (d=1.7) and the mixture is stirred for 15 hours, then twice its volume of water is added and the mixture is boiled until full solution is effected. The solution is poured into dilute caustic soda solution, causing the free base, 2:3-dihydro-2:4-dimethyl-8-amino-furo (3:2-c) quinoline, to be precipitated thereby. After recrystallization from solution in methylene chloride and ether, the product melts at 193° C.

*Example 4*

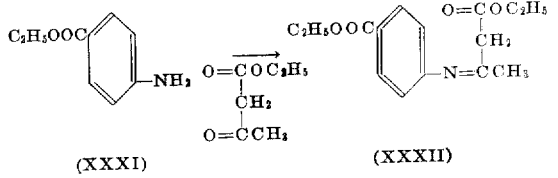

(XXXI)     (XXXII)

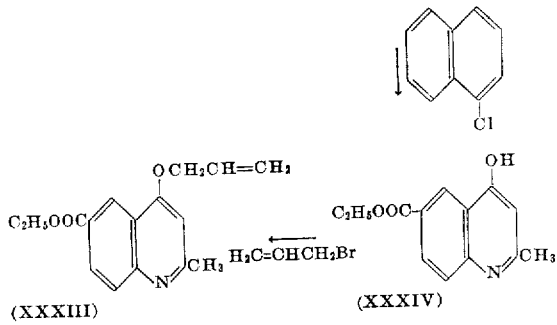

(XXXIII)     (XXXIV)

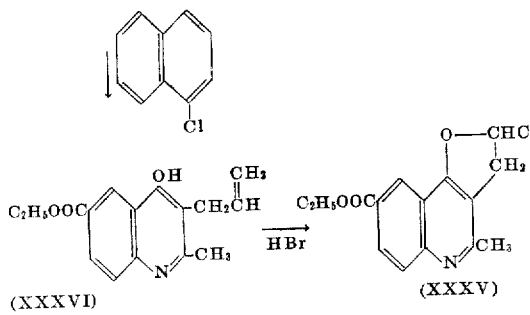

(XXXVI)     (XXXV)

This product (XXXV) is obtained by condensing ethyl p-aminobenzoate with ethyl acetoacetate to yield a Schiff's base, cyclizing this product to obtain 2-methyl-4-hydroxy-6-carbethoxy-quinoline, melting at 256° C., condensing this product with allyl bromide to yield 2-methyl-4-allyloxy-6-carbethoxy-quinoline, melting at 110° C., then heating this compound to effect intramolecular rearrangement to 2-methyl-3-allyl-4-hydroxy-6-carbethoxy quinoline, melting at 306° C. and boiling at 186° C. under 0.4 mm. pressure, which cyclizes when heated with hydrobromic acid to yield 2:3-dihydro-2:4-dimethyl-8-carbethoxy furo (3:2-c) quinoline.

*Example 5*

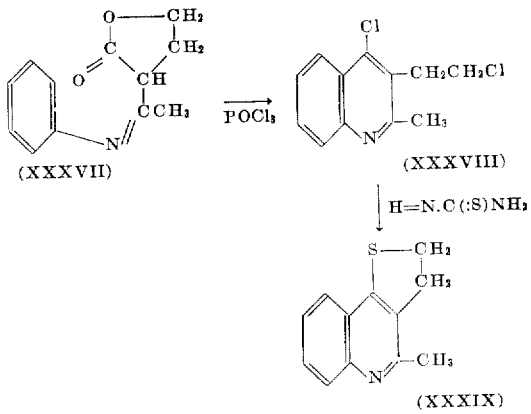

(XXXVII)     (XXXVIII)

(XXXIX)

Approximately 30 parts of the Schiff's base prepared by reacting α-acetyl-butyrolactone with aniline are boiled in 50 parts of xylene and 80 parts of phosphorus oxychloride are added thereto dropwise. After the addition of phosphorus oxychloride is completed, the mixture is boiled for an hour, then the xylene and excess phosphorus oxychloride are distilled off. The residue is mixed with water and ammonia and the reaction product is taken up with ether. The ethereal solution is dried and the ether distilled off, leaving a residue consisting of 2-methyl-3-β-chloroethyl-4-chloro-quinoline, having a boiling point of 156° C. under 2 mm. pressure and a melting point of 60° C.

About 4.8 parts of this product are boiled in 30 parts of ethanol with 0.5 part of thiourea and after a short period, a solid substance is precipitated which dissolves again after further boiling. After boiling for 2 hours, the solution is filtered and, on cooling, the hydrochloride of the final product precipitates in colorless needles. The precipitated material is removed, dissolved in a minimum quantity of water and the free base is precipitated by adding aqueous ammonia. This product melts at 109° C. and boils at 195–198° C. under 7 mm. pressure.

By treatment of suitably selected starting materials in an analogous manner, the following compounds can be synthesized:

(XXXX)

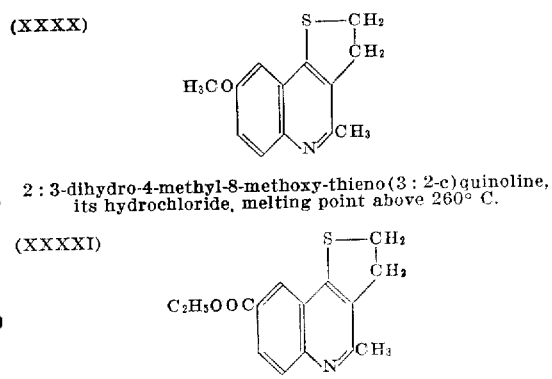

2:3-dihydro-4-methyl-8-methoxy-thieno(3:2-c)quinoline, its hydrochloride, melting point above 260° C.

(XXXXI)

2:3-dihydro-4-methyl-8-carbethoxy-thieno(3:2-c)quinoline, melting point 110° C., its hydrochloride, rosette-like needles, melting point 191° C.

(XXXXII)

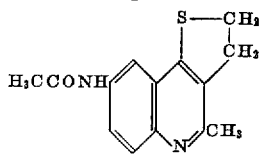

2:3-dihydro-4-methyl-8-acetylamino-thieno(3:2-c)-quinoline, colorless crystals, melting point 260° C.

Having thus described the subject matter of the present invention, what it is desired to secure by Letters Patent is:

1. As a new composition of matter a chemical substance represented by the formula

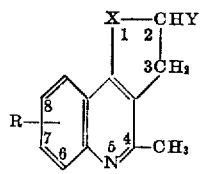

wherein X is a divalent atom selected from the group consisting of oxygen and sulfur, Y is a member of the group consisting of hydrogen and methyl, and R is a member of the group consisting of hydrogen and a substituent at not more than two of the positions 6, 7, 8 and 9 selected from the group consisting of lower alkyl, lower alkoxy, lower alkanoylamino, lower carboalkoxy, chloro, cyano and amino groups.

2. As a new composition of matter a chemical substance represented by the formula:

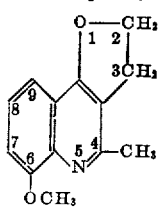

3. As a new composition of matter a chemical substance represented by the formula:

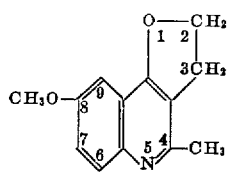

4. As a new composition of matter a chemical substance represented by the formula:

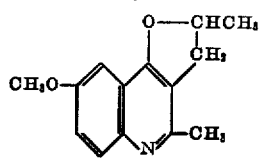

5. As a new composition of matter a chemical substance represented by the formula:

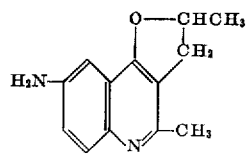

6. As a new composition of matter a chemical substance represented by the formula:

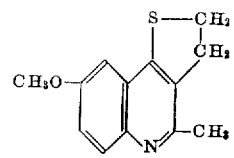

7. The process for making organic chemical compounds that comprises reacting a Schiff's base, obtained by condensing α-acetyl butyrolactone with a substance chosen from the group consisting of aniline and aniline nuclearly substituted by at least one and at most two substituents chosen from the group consisting of lower alkyl, lower alkoxy, lower alkanoylamino, lower carboalkoxy, chloro, cyano and amino with a strongly hydrophilic inorganic reagent under conditions favoring cyclization, and recovering from the reaction mixture a product represented by the formula:

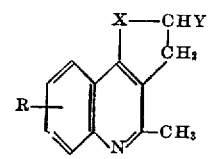

wherein X is a divalent atom chosen from the group consisting of oxygen and sulfur, Y is a member of the group consisting of hydrogen and methyl and R is a member of the group consisting of hydrogen and the substituents lower alkyl, lower alkoxy, lower alkanoylamino, carboalkoxy, chloro, cyano and amino groups.

8. The process defined in claim 7 wherein the reaction is performed in a boiling inert organic solvent medium.

9. The process defined in claim 7 wherein the strongly hydrophilic inorganic reagent is phosphorus pentoxide.

10. The process defined in claim 7 wherein the strongly hydrophilic inorganic reagent is phosphorus pentasulfide.

11. The process defined in claim 7 wherein the strongly hydrophilic inorganic reagent is zinc chloride.

HANS ANDERSAG.
HELMUT TIMMLER.

No references cited.

Certificate of Correction

Patent No. 2,650,226                                                August 25, 1953

HANS ANDERSAG ET AL.

It is hereby certified that error appears in the printed specification of the above numbered patent requiring correction as follows:

Column 1, line 32, for "substituted" read *unsubstituted*; column 6, Example 3, Formula XXVIII, for that portion reading "H$_2$CCONH—"      read      *H$_3$CCONH—* and that the said Letters Patent should be read as corrected above, so that the same may conform to the record of the case in the Patent Office.

Signed and sealed this 20th day of October, A. D. 1953.

[SEAL]

ARTHUR W. CROCKER,
*Assistant Commissioner of Patents.*